United States Patent
Özcan et al.

(10) Patent No.: US 10,983,062 B2
(45) Date of Patent: Apr. 20, 2021

(54) METHOD AND SYSTEM FOR ANALYSIS OF SAMPLES USING LASER INDUCED BREAKDOWN SPECTROSCOPY

(71) Applicant: ELEMISSION INC., Laval (CA)

(72) Inventors: Lütfü Çelebi Özcan, Saint-Laurent (CA); François Doucet, Laval (CA)

(73) Assignee: ELEMISSION INC., Laval (CA)

( * ) Notice: Subject to any disclaimer, the term of this patent is extended or adjusted under 35 U.S.C. 154(b) by 303 days.

(21) Appl. No.: 15/757,157

(22) PCT Filed: Sep. 2, 2016

(86) PCT No.: PCT/IB2016/055289
§ 371 (c)(1),
(2) Date: Mar. 2, 2018

(87) PCT Pub. No.: WO2017/037680
PCT Pub. Date: Mar. 9, 2017

(65) Prior Publication Data
US 2018/0275068 A1    Sep. 27, 2018

Related U.S. Application Data

(60) Provisional application No. 62/213,431, filed on Sep. 2, 2015.

(51) Int. Cl.
*G01N 21/71* (2006.01)
*G01N 1/34* (2006.01)
(Continued)

(52) U.S. Cl.
CPC .......... *G01N 21/718* (2013.01); *B07C 5/342* (2013.01); *G01N 1/34* (2013.01); *G01N 21/85* (2013.01);
(Continued)

(58) Field of Classification Search
CPC ......... B07C 5/342; G01J 3/0289; G01N 1/34; G01N 2021/845; G01N 21/718;
(Continued)

(56) References Cited

U.S. PATENT DOCUMENTS

| 6,603,903 B1 * | 8/2003 | Tong ................. G02B 6/02114 385/37 |
| 2002/0167581 A1 * | 11/2002 | Cordingley .......... B23K 26/064 347/173 |

(Continued)

FOREIGN PATENT DOCUMENTS

| CA | 2931676 A1 | 6/2015 |
| WO | 2006/122429 A1 | 11/2006 |

OTHER PUBLICATIONS

International Search Report and Written Opinion for Int. App. No. PCT/IB2016/055289, dated Oct. 6, 2016.

*Primary Examiner* — Sunghee Y Gray
(74) *Attorney, Agent, or Firm* — McDonnell Boehnen Hulbert & Berghoff LLP

(57) ABSTRACT

A system for optically scanning a region comprising a sample of which a chemical composition is to be determined, comprising: a pulsed laser source for emitting a pulsed laser beam; a focusing device for adjusting the position of the waist of the laser beam along an optical path of the laser beam; a deflector for adjusting a propagation direction of the laser beam to a given direction; a controller for varying, via the beam deflector, the propagation direction of the pulsed laser beam according to a predefined beam path and varying, via the focusing device, the given position of the waist of the laser beam along the optical path; and a photodetector for detecting light emitted by a plasma created when a given one of laser pulses has an irradiance is greater
(Continued)

than a breakdown threshold, the detected light being indicative of the chemical composition of the sample.

6 Claims, 7 Drawing Sheets

(51) Int. Cl.
      *G01N 21/85*     (2006.01)
      *G01N 21/88*     (2006.01)
      *B07C 5/342*     (2006.01)
      *G01N 21/84*     (2006.01)
      *G01J 3/02*     (2006.01)

(52) U.S. Cl.
      CPC ........ *G01N 21/8806* (2013.01); *G01J 3/0289* (2013.01); *G01N 2021/845* (2013.01); *G01N 2201/0633* (2013.01); *G01N 2201/0636* (2013.01)

(58) Field of Classification Search
      CPC ............... G01N 21/85; G01N 21/8806; G01N 2201/0633; G01N 2201/0636
      USPC ........................................................ 356/316
      See application file for complete search history.

(56) References Cited

U.S. PATENT DOCUMENTS

| | | | |
|---|---|---|---|
| 2003/0016353 A1* | 1/2003 | Detalle | B23K 26/032 356/318 |
| 2006/0084957 A1 | 4/2006 | Delfyett et al. | |
| 2009/0091745 A1* | 4/2009 | Levesque | G01N 21/718 356/73 |
| 2014/0085631 A1* | 3/2014 | Lacour | G01J 3/0218 356/316 |
| 2014/0202490 A1* | 7/2014 | Day | G01J 3/443 134/1.1 |
| 2017/0167982 A1* | 6/2017 | Doucet | G01N 21/718 |

* cited by examiner

METHOD AND SYSTEM FOR ANALYSIS OF SAMPLES USING LASER INDUCED BREAKDOWN SPECTROSCOPY

CROSS REFERENCE TO RELATED APPLICATIONS

The present application is a U.S. National Phase Application pursuant to 35 U.S.C. § 371 of International Application No. PCT/IB2016/055289 filed Sep. 2, 2016, which claims priority to U.S. Provisional Patent Application No. 62/213,431 filed Sep. 2, 2015. The entire disclosure contents of these applications are herewith incorporated by reference into the present application.

TECHNICAL FIELD

The present invention relates to the field of methods and systems for analysis of materials using Laser Induced Breakdown Spectroscopy (LIBS), and more particularly to methods and systems presenting high speed and high throughput for analysis.

BACKGROUND

LIBS is a well-known analytical technique for determining the constitution of a sample material. The LIBS approach involves focusing a laser beam onto the surface of the sample material with an irradiance adequate for vaporizing and ionizing a small part of the sample material and therefore producing a plasma or spark having an elemental composition representative of the material. Optical emissions from the plasma plume are detected and the spectral distribution, i.e. the optical intensity as a function of wavelength, of the detected optical emissions is analyzed using a spectrometer to obtain information representative of the spectral distribution. Since the atomic and molecular constituents of the sample material have unique optical emission spectra, the information produced by the spectrometer forms a fingerprint for the sample material, revealing the constituents of the sample onto which the laser beam was focused.

In some applications, LIBS is used for analysis of material to be sorted on a conveyor belt. Material surfaces, however, generally comprise an oxide coating layer or a coating layer containing nitrate, slag, paint, oil, and/or the like. Therefore, the surface is not representative of the bulk material to be analyzed. Usually, the coating layer is removed to access the bulk material. Some prior art LIBS systems are based on complex arrangements of high speed camera (for localization of the moving part on the conveyor belt, X and Y axis positions), line profile-o-meter (to measure the distance of the moving part on the conveyor belt, Z axis position), shape recognition algorithm (to detect, to determine the XYZ coordinate in real time)-seek the part-, three dimensional galvanometer to deflect (X-Y axis) and focus (Z axis) the beam on the detected moving part on the conveyor at XYZ coordinates. Such a prior art system is referred to as a seek, aim and analyze LIBS system hereinafter. LIBS analysis is then performed and the spectral information is processed to provide the chemical composition of the analyzed part.

At least some of the prior art seek, aim and analyze system presents some limitations such as limiting the mass flow traveling on the belt specially with conventional pulsed lasers having a frequency of about 30 Hz (pulses per second). In particular, some seek, aim and analyze systems present limited performances for high mass flow on the conveyor belt. In this case, the number of material parts that can be scanned is limited. In addition, for the seek, aim and analyze approach, an increase of mass flow on the conveyor belt directly implies an increase of the duty cycle of the instrument to about 100%, and at this duty cycle generally around 30 Hz, this approach limits the conveyor belt speed as well as its width. It has been demonstrated that the seek, aim and analyze approach fails to analyze more than 95% of the material moving on a conveyor belt. Moreover, the cleaning of the target surface has been demonstrated with the seek, aim and analyze approach, but since a few laser shots are required to clean the surface prior to analysis, it compromises directly the analysis speed of the analysis since conventional lasers operates at about 30 Hz.

Therefore there is a need for an improved method and system for analyzing samples using a LIBS system.

SUMMARY

In one embodiment, there is provided a high speed and high throughput method and apparatus for online analysis of materials by LIBS measurement.

In another embodiment, there is provided a method and apparatus for cleaning the surface of a material for a LIBS measurement by drying the surface, removing or ablating the surface coating layer not representative of the bulk material in a very short of time using a special combination of variable laser pulses spot sizes for ablation prior to LIBS analysis.

In a further embodiment, there is provided a method and apparatus for covering a large depth of field over the conveyor belt as well as covering a large scanning width at high frequency (i.e. more than 100 Hz), enabling a large sampling of the material to achieve more accurate and more representative measurements than classical instrumentation, without sample preparation.

In one embodiment, the proposed method and system are based on a passive scanning approach in which a pulsed laser at high frequency (i.e. more than 100 Hz) is coupled with scanning optics and a high speed focusing telescope to scan the conveyor belt and the depth of field. The key strategy to this approach is to scan the depth of field with a pulsed laser at high frequency with a lens (which create normally a small depth of field) with focus shifter device that allow to create laser-matter interaction with the material to be analyzed when the irradiance (i.e. Power density) 1) lower than ablation threshold (drying of the surface) 2) higher than the ablation threshold (i.e. for cleaning of the surface) 3) higher than the breakdown threshold (i.e. to induce a plasma for atomic emission spectrometry). Therefore, the present invention includes laser drying and cleaning of the surface as well as the analysis without needing to localize the parts position on the X-axis, Y-axis and Z-axis with a complex combination of machine vision and/or profilometry using a laser continuous operation at high frequency (frequency greater than 100 Hz).

The expressions "passive LIBS system" and "passive LIBS method" refers to LIBS methods and systems in which there is no active tracking of samples or objects, no active determination of a distance between the LIBS system and the surface of the sample, and no active adjustment of the system according to the determined distance. While in a passive LIBS systems some adjustments of some pieces of equipment may be performed over time during a scan, these adjustments are predetermined or predefined and they do not depend on the position over time of the sample of which the composition is to be determined using the LIBS system.

In the following, the terms "plasma" and "spark" can be used interchangeably.

According to a first broad aspect, there is provided a system for optically scanning a region comprising a sample of which a chemical composition is to be determined, comprising: a pulsed laser source for emitting a pulsed laser beam comprising a plurality of temporally ordered laser pulses; a focusing device for adjusting the position of the waist of the pulsed laser beam to a given position along the optical path of the pulsed laser beam; a beam deflector for adjusting a propagation direction of the pulsed laser beam to a desired scan direction; a controller being in communication with the focusing device and the beam deflector, the controller for varying, via the beam deflector, the propagation direction of the pulsed laser beam according to a predefined beam path and varying, via the focusing device, the given position of the waist of the pulsed laser beam along the optical path of the pulsed laser beam; and a photodetector for detecting light emitted by a plasma created when a given one of the laser pulses has an irradiance at a surface of the sample located on the optical path is greater than a breakdown threshold, the detected light being indicative of the chemical composition of the sample.

In one embodiment, the beam deflector comprises a rotatable mirror for reflecting the pulsed laser beam according to a desired scan angle.

In one embodiment, wherein the focusing device comprises a focusing telescope.

In one embodiment, the focusing telescope comprises a Galilean telescope having a movable diverging lens and a converging lens.

In one embodiment, wherein the focusing telescope comprises a motorized focus shifter for moving the diverging lens.

According to a second broad aspect, there is provided a method for optically scanning a region comprising a sample of which a chemical composition is to be determined, comprising: generating a pulsed laser beam comprising a plurality of laser pulses and propagating the pulsed laser beam along an optical path; adjusting a propagation direction of the pulsed laser beam to a given direction; adjusting a position of a waist of the pulsed laser beam at a given position along the optical path of the pulsed laser beam, and varying the position of a waist of the pulsed laser beam along the optical path; and detecting light emitted by a plasma created when a given one of the laser pulses has an irradiance at a surface of the sample located on the optical path is greater than a breakdown threshold, the detected light being indicative of the chemical composition of the sample.

In one embodiment, the method further comprises a step of varying the propagation direction of the pulsed laser beam according to a predefined beam path.

In one embodiment, the step of adjusting a position of a waist of the pulsed laser beam comprises propagating the pulsed laser beam in a focusing telescope.

In one embodiment, the focusing telescope comprises a Galilean telescope having a movable diverging lens and a converging lens.

In one embodiment, the step of varying the given position of the waist comprises activating a motorized focus shifter, thereby moving the diverging lens.

In accordance with another embodiment, there is provided a method for cleaning and scanning a sample of which a chemical composition is to be determined, comprising: directing a pulsed laser beam on the sample, the pulsed laser beam comprising a plurality of laser pulses; adjusting an irradiance of at least a first one of the laser pulses at a surface of the sample to a first value being comprised between an evaporation threshold and an ablation threshold, thereby drying a surface of the sample; adjusting an irradiance of at least a second one of the laser pulses at the surface of the sample to a second value being greater than the ablation threshold and less than a breakdown threshold, thereby cleaning the surface of the sample; adjusting an irradiance of at least a third one of the laser pulses at the surface of the sample to a third value being greater than the breakdown threshold, thereby creating a plasma; and detecting a light emitted by the plasma, the detected light being indicative of the chemical composition of the sample.

In one embodiment, the step of directing a pulsed laser beam on the sample comprises propagating the pulsed laser beam in a focusing telescope.

In one embodiment, the focusing telescope comprises a Galilean telescope having a movable diverging lens and a converging lens.

In one embodiment, the focusing telescope further comprises a motorized focus shifter for moving the diverging lens.

In one embodiment, the step of adjusting an irradiance of at least a first one of the laser pulses at a surface of the sample to a first value comprises focusing the pulsed laser beam at a first position relative to the surface of the sample; the step of adjusting an irradiance of at least a second one of the laser pulses at the surface of the sample to a second value comprises focusing the pulsed laser beam at a second position relative to the surface of the sample, the second position being closer to the surface than the first position; and the step of adjusting an irradiance of at least a third one of the laser pulses at the surface of the sample to a third value comprises focusing the pulsed laser beam at a third position relative to the surface of the sample, the third position being closer to the surface than the second position.

According to a further embodiment, there is provided a system for cleaning and scanning a sample of which a chemical composition is to be determined, comprising: a pulsed laser source for emitting a pulsed laser beam comprising a plurality of laser pulses, each one of the laser pulses having a respective irradiance when hitting a surface of an sample being positioned along an optical path of the pulsed laser beam; a focusing device for focusing the pulsed laser beam at a given focus position along the optical path of the pulsed laser beam; a controller for controlling one of the pulse laser source and the focusing device, the controller for: adjusting the irradiance of at least a first one of the laser pulses to a first value comprised between an evaporation threshold and an ablation threshold to dry the surface of the sample; adjusting an irradiance of at least a second one of the laser pulses to a second value comprised between the ablation threshold and a breakdown threshold to clean the surface of the sample; and adjusting an irradiance of at least a third one of the laser pulses to a third value greater than the breakdown threshold to create a plasma; and a photodetector for detecting light emitted by the plasma, the detected light being indicative of the composition of the sample.

In one embodiment, the focusing device comprises a focusing telescope.

In one embodiment, the focusing telescope comprises a Galilean telescope having a movable diverging lens and a converging lens.

In one embodiment, the focusing telescope further comprises a motorized focus shifter for moving the diverging lens.

In one embodiment, the controller is adapted to: focus the pulsed laser beam at a first position relative to the surface of the sample; focus the pulsed laser beam at a second position relative to the surface of the sample, the second position being closer to the surface than the first position; and focus the pulsed laser beam at a third position relative to the surface of the sample, the third position being closer to the surface than the second position.

BRIEF DESCRIPTION OF THE DRAWINGS

Further features and advantages of the present invention will become apparent from the following detailed description, taken in combination with the appended drawings, in which:

FIG. 6b is a front view of the exemplary LIBS system of FIG. 6a;

It will be noted that throughout the appended drawings, like features are identified by like reference numerals.

DETAILED DESCRIPTION

Figure 1:
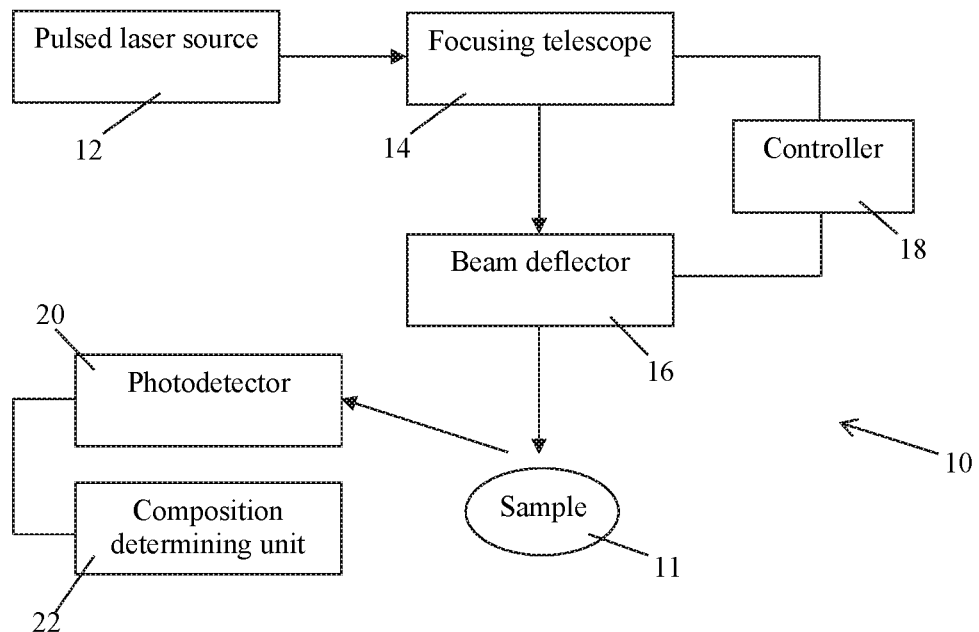
FIG. 1 is a block diagram of a passive LIBS system for optically scanning a given region comprising a sample of which the chemical composition is to be determined, in accordance with an embodiment.

FIG. 1 illustrates a system 10 for optically scanning a region comprising a sample 11 of which the chemical composition is to be determined. A sample 11 may be an object, a piece of material, an ore, a particle contained within a fluid such as contained in air or in a liquid, and/or the like. The system 10 corresponds to a passive LIBS system. The system 10 comprises a pulsed laser source 12, a focusing device 14, a beam deflector 16, at least one controller 18 for controlling the focusing device 14 and the beam deflector 16, a photodetector 20 and a composition determining unit or module 22.

The pulsed laser source 12 is adapted to emit a plurality of timely-spaced laser pulses having a wavelength adapted to create a plasma when an optical pulse having an adequate irradiance reaches the surface of the sample 11. The laser pulses form a pulsed laser beam. The pulsed laser beam propagates up to the focusing device 14 which is adapted to focus the pulsed laser beam at a focal plane located at a given position along the optical path of the pulsed laser beam. It should be understood that the waist of the pulsed laser beam is minimal at the position corresponding to that of the focal plane. Therefore, the focusing device 14 is adapted to position the waist of the pulsed laser beam at the position of the focal plane. The focusing device 14 is further adapted to vary the position of the focal plane, i.e. vary the distance at which the pulsed beam focuses, and therefore vary the position of the waist of the pulsed laser beam along the optical path of the pulsed laser beam. By varying the position of the focal plane, the depth of field is also varied. The focusing device 14 propagates the pulsed laser beam up to the beam deflector 16 which is adapted to deflect the pulsed laser beam or vary the propagation direction of the pulsed laser beam. The deflected pulsed laser beam coming from the beam deflector 16 propagates up to the sample 11.

The controller 18 is adapted to control the focusing device 14 and the beam deflector 16. While the present description refers to a single controller 18 for controlling both the focusing device 14 and the beam deflector 16, it should be understood that two different controllers may be used, each for controlling a respective one of the focusing device 14 and the beam deflector 16.

The controller 18 is adapted to control the focusing device 14 in order to position the waist of the pulsed laser beam at an initial position along the optical path of the pulsed laser beam and vary the position of the waist of the pulsed laser beam up to a final position. The initial and final waist positions correspond to a predetermined range of waist position. In one embodiment, the variation of the waist position is performed iteratively so that the waist takes discrete positions between the initial and final positions. In another embodiment, the change of waist position is performed substantially continuously between the initial and final positions. In one embodiment, the pulsed laser source 12 operates during a one-way movement of the waist position between the initial and final positions so that measures are taken only during the one-way movement of the waist position from the initial position to the final position and no measures are taken while the waist position is moved back from the final position to the initial position. In another embodiment, the pulsed laser source 12 operates during a two-way movement of the waist position between the initial and final positions so that the pulsed laser source 12 operates and measures are taken during the movement of the waist position from the initial position to the final position and during the movement of the waist position from the final position to the initial position.

The controller 18 is further adapted to control the beam deflector 16 in order to direct the pulsed laser beam along an initial propagation direction and vary the propagation direction up to a final propagation direction. The set of propagation directions taken by the pulsed laser beam corresponds to a predetermined or predefined scan path. In one embodiment, the variation of the propagation direction is performed iteratively so that a discrete number of propagation directions is comprised between the initial and final propagation directions. In another embodiment, the change of propagation direction is performed substantially continuously between the initial and final propagation directions. In one embodiment, the pulsed laser source 12 operates during a one-way movement of the propagation direction between the initial and final propagation directions so that measures are taken only during the one-way movement of the propagation direction from the initial propagation direction to the final propagation direction and no measures are taken while the propagation direction is moved back from the final propagation direction to the initial propagation direction. In another embodiment, the pulsed laser source 12 operates during a two-way movement of the propagation direction between the initial and final propagation directions so that the pulsed laser source 12 operates and measures are taken during the movement of the propagation direction from the initial propagation direction to the final propagation direction and during the movement of the propagation direction from the final propagation direction to the initial propagation direction.

The photodetector 20 is adapted to detect the light emitted by a plasma created when a laser pulse reaches a sample. The photodetector 20 is adapted to detect light having the same wavelength(s) as those of the light emitted by the plasma. The photodetector 20 detects the light incoming thereon and converts the optical amplitude of the detected light into an electrical signal which is transmitted to the composition determining unit 22. In one embodiment, the photodetector 20 operates substantially continuously, i.e. it detects incoming light at all time. In another embodiment, the photodetector 20 is synchronized with the pulsed laser source 12 so as to be in operation only when a pulse is emitted. In this case, the controller 18 is further adapted to control the photodetector 20 so as to synchronize it with the pulsed laser source 12.

The composition determining unit 22 receives the electrical signal from the photodetector 20. The electrical signal is indicative of the amplitude of the detected light as a function of wavelength. The composition determining unit 22 is further adapted to determine the composition of the sample that was hit by a laser pulse and created the plasma, as known in the art.

In one embodiment, the relative position between the LIBS system 10 and the sample 11 to be analyzed may be unknown and may change in time. For example, the sample 11 to be analyzed may be positioned on a support and the LIBS system 10 may be motorized so as the move relative to the support. In another embodiment, the LIBS system 10 may have a fixed position and the sample 11 to be analyzed may move relative to the LIBS system 10. For example, the LIBS system 10 may be used to scan samples 11 moving on a conveyor belt. In this case, the LIBS system 10 may scan the width of the conveyor belt and the scan path according to which the propagation direction of the pulsed laser beam is varied is adapted to scan the width of the conveyor belt. Samples 11 of which the chemical composition is to be determined are placed on the conveyor belt at any locations thereon. The LIBS system 10 is adapted to scan the width of the conveyor belt and analyze at least some of the samples 11 moving on the conveyor belt. It should be understood that the scanning speed of the LIBS system 10 is chosen to be much faster that the speed at which the samples 11 move on the conveyor belt.

In one embodiment, the LIBS system 10 is adapted to scan and analyze substantially all of the samples 11 present on the conveyor belt. In this case, the speed of variation of the propagation direction of the pulsed laser beam is chosen to be much greater than the speed of the conveyor belt. Furthermore, the speed of variation of the focal plane position of the focusing device 14 is chosen to be much greater than the speed of variation of the propagation direction. It should be understood that the speeds of variation of the propagation direction and the focal plane position are chosen as a function of the scanning width, the speed of the conveyor belt, and may further be chosen as a function of an expected size for the samples 11, an expected distance between following samples 11 on the conveyor belt, a number of analysis required on each sample 11, and/or the like. The person skilled in the art will understand that the different speeds may be adequately chosen so that substantially all of the samples present on the conveyor belt may be hit by a laser pulse having an adequate irradiance for generating a plasma and therefore be analyzed.

When the system LIBS 10 is used to analyze samples 11 on a conveyor belt, the person skilled in the art will understand that the position of a given sample being analyzed by the system 10 may be determined. The position of a sample 11 along the length of the conveyor belt may be determined from the time at which the plasma is detected. The position along the width may be determined using the propagation direction that was used to create the plasma. The height of the sample 11 may also be determined using the position of the focal plane at which the plasma was created.

In one embodiment, the pulsed laser source 12 is adapted to emit a substantially continuous train or wave of optical pulses during a given period of time. The laser pulses are substantially identical and two consecutive laser pulses are spaced apart by a substantially equal period of time. In addition, the temporal profile of each pulse may be adjusted according to different shapes to adjust adequately the laser-matter interaction on the sample 11.

In one embodiment, the frequency, i.e. the repetition rate or number of pulses emitted per second, of the pulsed laser source 12 is substantially equal to or greater than 100 Hz.

While in the illustrated embodiment, the focusing device 14 is positioned between the pulsed laser source 12 and the beam deflector 16, it should be understood that other configurations may be possible. For example, the beam deflector 16 may be positioned between the pulsed laser source 12 and the focusing device 14. In this case, the person skilled in the art will understand that the relative position between the focusing device 14 and the beam deflector 16 is fixed so that the orientation of the focusing device 14 follows the orientation of the beam deflector 16 for example.

Figure 2:
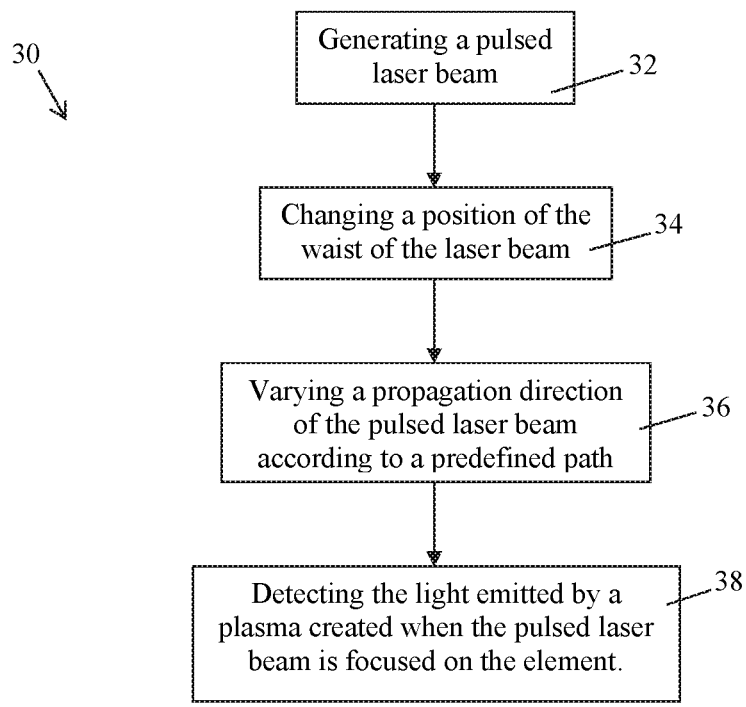
FIG. 2 is a flow chart illustrating a passive LIBS method for optically scanning a given region comprising a sample of which the chemical composition is to be determined, in accordance with an embodiment.

FIG. 2 illustrates one embodiment of a method 30 for optically scanning a region containing a sample 11 of which the chemical composition is to be determined. The method 30 describes the operation of the system 10. At step 32, a pulsed laser beam is generated and propagated by the pulsed laser source 12 for example. The pulsed laser beam comprises a sequence of timely ordered laser pulses. The wavelength of the pulsed laser beam is adequate for creating a plasma when the pulsed laser beam illuminates the sample 11 and when the irradiance of the pulses is greater than a breakdown threshold as described below.

In one embodiment, the laser pulses contained in the pulsed laser beam are substantially identical. In another embodiment, at least two laser pulses contained in the pulsed laser beam may be different. For example, the amplitude of at least two laser pulses may be different.

In one embodiment, the temporal separation between two subsequent laser pulses is substantially constant. In another embodiment, the temporal separation between subsequent laser pulses may vary in time.

At step 34, the pulsed laser beam is focused on a focal plane at a given position along the optical path of the pulsed laser beam and the position of the focal plane is varied in time within a given range. It should be understood that step 34 is equivalent to positioning the waist of the pulsed laser beam at the given position along the optical path of the pulsed laser beam and varying the position of the pulsed laser beam waist within the given range. For example, the focusing device 14 may be used for focusing the pulsed laser beam and vary the waist position/focal plane position. The pulsed laser beam is first focused at an initial focal plane position located at an initial distance from a reference point such as the position of the focusing device 14 or that of the beam reflector 16. The position of the focal plane is varied until the pulsed laser beam be focused at a final focal plane position which is located at a final distance from the reference point. In one embodiment, the position of the focal plane is varied iteratively in a stepwise manner between the initial position and the final position. In another embodiment, the position of the focal plane is varied substantially continuously between the initial position and the final position. In this case, the speed of variation of the focal plane position is adequately chosen as described below.

By varying the position of the focal plane where the pulsed laser beam focuses, it is possible to expand the field of view of the system 10 and virtually expand the Rayleigh zone or range of the pulsed laser beam. For a given pulsed beam power, the Rayleigh zone refers to the range where a pulse has a maximal irradiance. Therefore, the range where a maximal irradiance may be obtained is increased by changing the position of the focal plane of the focusing telescope 14.

At step 36, the propagation direction of the pulsed laser beam is varied according to a predetermined path in order to optically scan a given region in which a sample may be located.

In one embodiment, the propagation direction of the pulsed laser beam is varied by moving the focusing device according the predetermined path 14. It should be understood that any adequate movement of the focusing device 14 required for the pulsed laser beam to follow the predetermined path may be used. In a first example, the focusing device 14 may be translated along at least one translation axis. In this case, the focusing device 14 may be mounted on at least one translation stage for example. In another example, the focusing device 14 may be rotated about at least one rotation axis. It should be understood that a combination of translations and rotations of the focusing device 14 may be used to obtain the predetermined path.

In one embodiment, the relative position between the pulsed laser source 12 and the focusing device 14 is fixed. In this case, the pulsed laser source 12 is also moved to follow the same movements as those of the focusing device 14. For example, the pulsed laser source 12 and the focusing device 14 may be mounted on a same support which is motorized to move the focusing device 14 according to the predetermined path.

In another embodiment, a beam deflector 16 may be used to move the pulsed laser beam according to the predetermined path, as described above.

At step 36, light emitted by a plasma is detected. The plasma is created each time a laser pulse having an irradiance greater than the breakdown threshold hits the surface of a sample present along the predetermined path of the pulsed laser beam. The chemical composition of the sample 11 may then be determined for the spectral composition of the detected light.

In one embodiment, the propagation direction of the pulsed laser beam is moved in a stepwise manner to scan a given number of discrete propagation directions. For example, the beam deflector 16 may be iteratively rotated about a single rotation axis between two extreme angular positions to move the propagation direction of the pulsed laser beam. If the method 30 is used to scan samples positioned on a support surface such as a conveyor belt, the points of the support surface illuminated by the pulsed laser beam are positioned along a line between two linear positions which correspond to the angle positions between which the beam deflector 16 is rotated. For example, if the beam deflector 16 takes four angular positions, then the pulsed laser beam is given four different propagation directions and four points of the surface will be illuminated by the pulsed laser beam.

For each discrete propagation direction, a train of at least two laser pulses is emitted and the position of the waist of the pulsed laser beam is changed at a given speed. The speed of change of the waist position may be chosen so that a respective waist position corresponds to each laser pulse. It should be understood that the speed of waist position change is chosen as a function of the repetition rate of the pulsed laser source and the speed of waist position change may be chosen so that more than one laser pulse corresponds to a given waist position. Therefore, the position along the propagation direction where the laser pulses will have their maximal irradiance changes as a function of the position of the focal plane, i.e. the position of the waist of the pulsed laser beam. If, for a given propagation direction of the pulsed laser beam, the surface of a sample is positioned along the path of the pulsed laser beam at the position where the waist of the pulsed laser beam is located, a laser pulse having an irradiance greater than the breakdown threshold at the waist position will create a plasma when hitting the surface of the sample. If the irradiance of the laser pulse at the waist of the pulsed laser beam (where the surface of the sample is also located) is less than the ablation threshold but greater than a given threshold allowing water evaporation, the portion of the surface of the sample that is illuminated by the laser pulse, which corresponds to the spot size of the laser on the sample surface, is dried. If the irradiance of the laser pulse at the waist of the pulsed laser beam (where the surface of the sample is also located) is greater than the ablation threshold but less than the breakdown threshold, the portion of the surface of the sample that is illuminated by the laser pulse is ablated, i.e. some material is removed from the illuminated portion of the sample 11 surface. And as mentioned above, If the irradiance of the laser pulse at the waist of the pulsed laser beam (where the surface of the sample is also located) is greater than the breakdown threshold, a plasma is generated as a result of an interaction between the laser pulse and the sample and light is emitted by the plasma.

If a sample is positioned at an unknown position along the path of the pulsed laser beam, the speed of change of the waist position along the optical path of the pulsed laser beam and the repetition rate of the pulsed laser source 12 may be adequately chosen so that at least a first laser pulse hits the surface of the sample with a first irradiance being greater than the breakdown threshold so that a plasma is created. The detection of light emitted by the plasma is interpreted as the detection of the sample 11. It should be understood that the position of the detected sample 11 may then be determined using the given propagation direction and the given focal plane position at which the light has been detected. In one embodiment, the speed of change of the waist position along the optical path of the pulsed laser beam and the repetition rate of the pulsed laser source 12 may be adequately chosen so that at least a first laser pulse hits the surface of the sample 11 with a first irradiance being comprised between the evaporation threshold and the ablation threshold in order to dry the illuminated portion of the sample 11 surface, at least a second laser pulse hits the surface of the sample 11 with a second irradiance being comprised the ablation threshold and the breakdown threshold in order to ablate the sample 11 surface, and at least a third laser pulse hits the sample 11 surface with a third irradiance being greater than the breakdown threshold in order to create a plasma.

When the range of focal plane positions has been scanned, the propagation direction of the pulsed laser beam is changed to a second position and a second train of laser pulses is emitted to determine whether a sample is present along the path of the pulsed laser beam by detecting light emitted by a plasma and determine the composition of the sample.

It should be understood that when the number of propagation directions is discrete, the steps 34 and 36 are sequentially performed. For example, step 34 may be first performed and then step 36 is performed. Alternatively, step 36 may be performed prior to step 34.

In another embodiment, the propagation direction of the pulsed laser beam is changed substantially continuously in time between the two extreme propagation directions. In this case, the steps 34 and 36 may be performed substantially concurrently, i.e. the position of the waist of the pulsed laser beam is changed while the propagation direction of the pulsed laser beam is varied.

It should be understood that the footprint or spot size of a first laser pulse having the first irradiance on the sample 11 surface is greater than the footprint of a second laser pulse having the second irradiance which is greater than the footprint of a third laser pulse having the third irradiance. The person skilled in the art will understand that, when the propagation direction is substantially continuously changed, the speed of change of the propagation direction, the speed of change of the waist position, and the repetition rate of the pulsed laser source may be adequately chosen to position the footprint of the second pulse within the footprint of the first laser pulse so that the ablated region be within the dried region, and position the footprint of the third laser pulse within the footprint of the second laser pulse so that the plasma be created in the ablated region. If the sample 11 is positioned on a conveyor belt, the speed of the conveyor belt is also taken into account.

Figure 3:
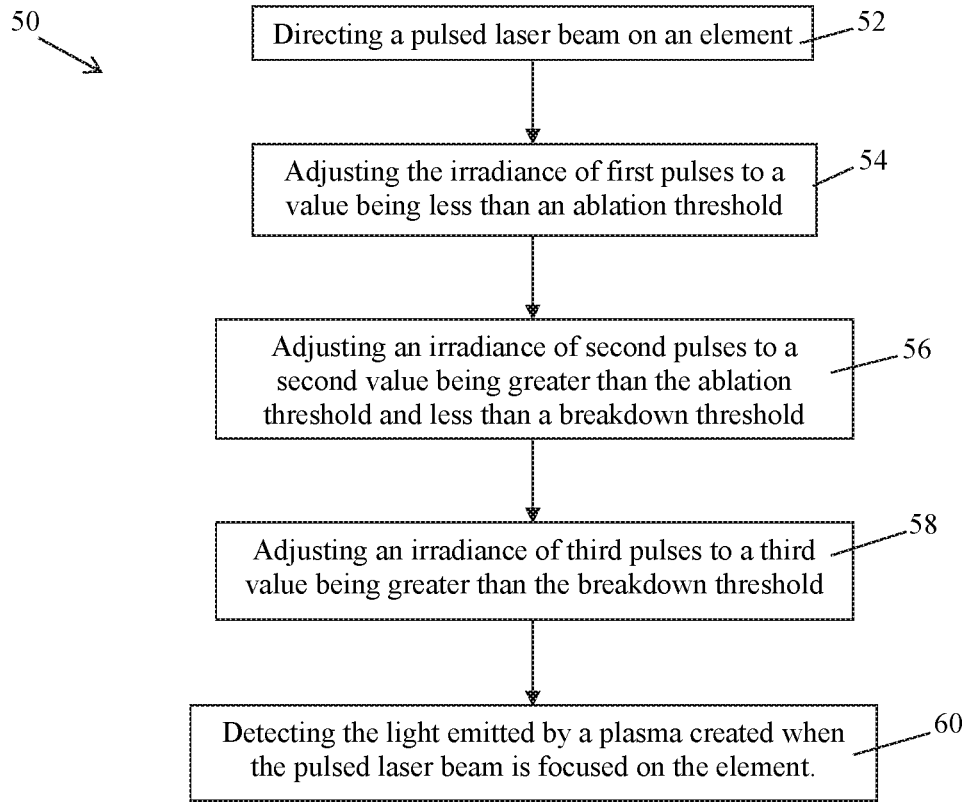
FIG. 3 is a flow chart illustrating of a LIBS method for optically analyzing a sample of which the chemical composition is to be determined, in accordance with an embodiment.

FIG. 3 illustrates one embodiment of a method 50 for optically scanning a sample 11 of which the chemical composition is to be determined. At step 52, a pulsed laser beam is generated and directed towards the surface of the sample 11 to be analyzed. The pulsed laser beam comprises a series of timely ordered laser pulses. The laser pulses may be substantially identical. In another example, the laser pulses may have different characteristics.

In one embodiment, a single laser source is used to generate the pulsed laser beam.

In another embodiment, more than one laser source may be used to generate the pulsed laser beam. In this case, the different laser sources each emit a pulsed laser beam and the pulsed laser beams are combined together, using a beam combiner for example, so as to share the same optical path. The different laser sources are synchronized together so as to subsequently emit laser pulses according to a given sequence. In an example in which three laser sources are synchronized together, an exemplary sequence of laser pulses may be the following one. First, the first laser sources emits at least one first laser pulse which is followed by the emission of at least one second laser pulse by the second laser source. The second laser pulse(s) is(are) followed by the emission of at least one third laser pulse by the third laser source. The first, second and third laser pulses may have different characteristics such as different wavelengths, different amplitudes, different durations, and/or the like.

At step 54, the irradiance of at least one first laser pulse is adjusted so that the irradiance of the first laser pulse at the surface of the sample 11 is comprised between the evaporation threshold and the ablation threshold in order to evaporate water from a given region of the surface of the sample and therefore dry the surface of the sample 11.

In one embodiment, the irradiance of the first laser pulse is adjusted to a first desired value comprised between the evaporation threshold and the ablation threshold by positioning the waist of the pulsed laser beam at a first adequate distance from the surface of the sample 11.

In another embodiment, the irradiance of the first pulse is adjusted to a desired value comprised between the evaporation threshold and the ablation threshold by adjusting the amplitude or power of the first laser pulse to a first adequate value. For example, the amplitude or power of the laser pulses generated by the pulsed laser source may be substantially constant throughout the pulses and a filter may be used to adjust the amplitude of the first laser pulse to the first adequate value.

In a further embodiment, the irradiance of the first pulse is adjusted to a desired value comprised between the evaporation threshold and the ablation threshold by adjusting the time duration of the first laser pulse to a first adequate value.

It should be understood that any adequate method for adjusting the irradiance of the first laser pulse at the surface of the sample to the first desired value may be used. For example, the waveform of the laser pulses may be varied in order to adjust the irradiance to desired values.

At step 56, the irradiance of at least one second laser pulse is adjusted so that the irradiance of the second laser pulse at the surface of the sample is comprised between the ablation threshold and the breakdown threshold in order to ablate at least partially a given region of the surface of the sample and therefore clean the surface of the sample. In one embodiment, the ablated region substantially corresponds to the dried region. In another embodiment, the ablated region is contained within the dried region.

In one embodiment, the irradiance of the second laser pulse is adjusted to a second desired value comprised between the evaporation threshold and the ablation threshold by positioning the waist of the pulsed laser beam at a second adequate distance from the surface of the sample 11 that is less than the first adequate distance used for dying the surface.

In another embodiment, the irradiance of the second pulse is adjusted to a desired value comprised between the evaporation threshold and the ablation threshold by adjusting the amplitude or power of the second laser pulse to a second adequate value. For example, the amplitude or power of the laser pulses generated by the pulsed laser source may be substantially constant throughout the pulses and a filter may be used to adjust the amplitude of the second laser pulse to the second adequate value.

It should be understood that any adequate method for adjusting the irradiance of the second laser pulse at the surface of the sample to the second desired value may be used.

At step 58, the irradiance of at least one third laser pulse is adjusted so that the irradiance of the third laser pulse at the surface of the sample is greater than the breakdown threshold in order to generate a plasma when the third laser pulse reaches the surface of the sample. In one embodiment, the region of the surface sample illuminated by the third laser pulse substantially corresponds to the ablated region. In another embodiment, the region of the surface sample illuminated by the third laser pulse is contained within the ablated region.

In one embodiment, the irradiance of the third laser pulse is adjusted to a third desired value greater the ablation threshold by positioning the waist of the pulsed laser beam at a third adequate distance from the surface of the sample 11 being less than the second adequate distance for ablating the surface.

In another embodiment, the irradiance of the third pulse is adjusted to a desired value comprised between the evaporation threshold and the ablation threshold by adjusting the amplitude or power of the third laser pulse to a third adequate value. For example, the amplitude or power of the laser pulses generated by the pulsed laser source may be substantially constant throughout the pulses and a filter may be used to adjust the amplitude of the third laser pulse to the third adequate value.

It should be understood that any adequate method for adjusting the irradiance of the third laser pulse at the surface of the sample to the third desired value may be used.

In one embodiment, more than one method may be used for adjusting the irradiance of the laser pulses. For example, both the position of the waist of the pulsed laser beam and the amplitude or power of the laser pulses may be concurrently varied to achieve a desired irradiance value for the laser pulses at the surface of the sample 11.

In one embodiment, more than one laser source may be used to create the pulsed laser beam. For example, three different laser sources may be used. The different laser sources may emit light having different wavelengths, emit pulses having different amplitudes, and/or the like. The first laser source may be used to generate the first laser pulse(s) adequate for drying the surface of a sample 11. The second laser source may be used to generate the second laser pulse(s) adequate for ablating the dried surface of the sample 11. The third laser source may be used to generate the third laser pulse(s) adequate for creating a plasma when hitting the ablated surface of the sample 11. The three laser sources are synchronized so that the first laser source first emits at least one first laser pulse adequate for drying the sample 11 surface, the second laser source subsequently emits at least one second laser pulse for ablating the dried surface of the sample 11, and the third laser source then emits at least one third laser pulse adequate for creating a plasma. The pulsed laser beam then comprises a series of timely ordered laser pulse sequence. Each sequence comprises at least one first laser pulse temporally followed by at least one second laser pulse which is(are) are temporally followed by at least one third laser pulse.

In another embodiment, the pulsed laser beam is created using a single laser source. In one embodiment, at least one operating setting of the laser source may be changed over time to generate the three types of laser pulses. For example, the amplitude or power of the laser pulses may be varied over time to create the three types of laser pulses. In another embodiment, the laser source generates substantially identical laser pulses over time and the irradiance of the laser pulses is varied over time using an additional device such as a filter for adjusting the power/amplitude of the laser pulses generated by the laser source to desired values or a focusing device adapted to adjust the waist of the pulsed laser beam to desired values.

It should also be understood that the method 50 may be combined with the method 30 so as to vary the propagation direction of the pulsed laser beam in order to scan a given region wherein samples 11 may be present. The combined method may be used to analyze samples 11 moving on a conveyor belt.

Figure 4:
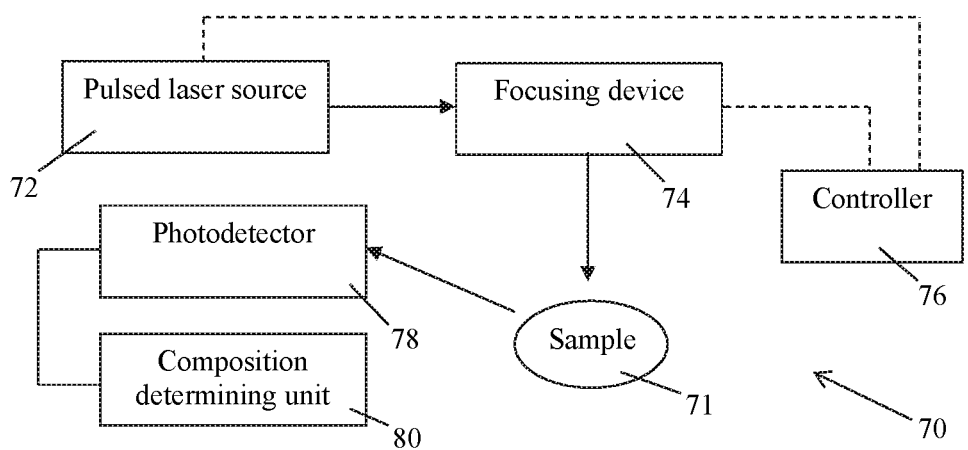
FIG. 4 is a block diagram of a LIBS system for optically analyzing a sample of which the chemical composition is to be determined, in accordance with an embodiment.

FIG. 4 illustrates an exemplary LIBS system 70 that may be used to perform the method 50. The system 70 comprises a pulsed laser source 72, a focusing device 74, a controller 76, a photodetector 78 and a composition determining unit 80.

The pulsed laser source 70 is adapted to emit a train of laser pulses as described above. The focusing device 74 is adapted to successively focus the pulsed laser beam emitted by the pulsed laser source 70 at different positions along the optical path of the pulsed laser beam so as to position the waist of the pulsed laser beam at the different positions along the optical path. The sample 51 to be analyzed is also positioned at a given position along the optical path of the pulsed laser beam. Each focus position along the optical path of the pulsed laser beam is chosen to correspond to a respective distance between the waist of the pulsed laser beam and the surface of the sample to be analyzed.

In one embodiment, the first focus position at which the waist of the pulsed laser beam is positioned along the optical path of the pulsed laser beam is chosen so that the irradiance of a laser pulse at the surface of the sample be greater than an evaporation threshold and less than an ablation threshold in order to dry the surface of the sample 71. In this case, the spot size of the pulsed laser beam has first dimensions. The focusing device 74 then positions the waist of the pulsed laser beam at a second and different focus position along the optical path of the pulsed laser beam and the second focus position is chosen so that the irradiance of a laser pulse hitting the surface of the sample 71 be greater than the ablation threshold and less than a breakdown threshold in order to clean the surface of the sample. The second focus position is closer from the surface of the sample 71 than the first focus position and the spot size of the pulsed laser beam on the surface of the sample 71 when it is focused at a second focus position is less than that when is it focused at the first focus position. The focusing device 74 then positions the waist of the pulsed laser beam at a third and different focus position along the optical path of the pulsed laser beam and the third focus position is chosen so that the irradiance of a laser pulse hitting the surface of the sample 71 be greater than the breakdown threshold in order to create a plasma. The third focus position is closer from the surface of the sample 71 than the second focus position and the spot size of the pulsed laser beam on the surface of the sample 71 when it is focused at a third focus position is less than that when is it focused at the second focus position.

It should be understood that the conditions of the irradiance for operating in one of the three modes, i.e. the drying mode, the cleaning mode, and the analysis mode, may be translated into conditions on the distance between the waist position and the surface of the sample 71 or on the position of the waist relative to the position of the sample surface. Therefore, when the distance between the waist position and the sample surface is comprised between a first and a second distance threshold, the pulses hitting the surface of the sample 71 have an irradiance comprised between the evaporation and the ablation thresholds, the first distance threshold being greater than the second distance threshold. When the distance between the waist position and the sample surface is comprised between the second and a third distance threshold, the pulses hitting the surface of the sample 71 have an irradiance comprised between the ablation and the breakdown thresholds, the second distance threshold being greater than the third distance threshold. When the distance between the waist position and the sample surface is less than the third distance threshold, the pulses hitting the surface of the sample 71 have an irradiance that is greater than the ablation threshold.

It should be understood that the controller 76 is adapted to control the focusing device 74 in order to adjust the position of the waist of the pulsed laser beam to a desired position along the optical path of the pulsed laser beam.

In one embodiment, the distance between the surface of the sample 71 and the focusing device 74 is unknown. In this case, the controller 76 is adapted to control the focusing device 74 so that the position of the waist of the pulsed laser beam changes along the optical path of the pulsed laser beam between an initial waist position and a final waist position. In one embodiment, the controller 76 may vary the waist position in a stepwise manner so that the waist position takes a discrete number of positions between the initial and final waist positions. In another embodiment, the controller 76 is adapted vary substantially continuously the position of the waist of the pulsed laser beam between the initial and final waist positions. A train of laser pulses is emitted by the pulsed laser source 72 while the focusing device 74 changes the position of the waist of the pulsed laser beam along the optical path thereof. When the distance between the waist position and the surface of the sample 71 is comprised between the first and second distance thresholds, the surface of the sample 71 is dried by at least one first laser pulse emitted by the pulsed laser source 72. When the distance between the waist position and the surface of the sample 71 is comprised between the second and third distance thresholds, the surface of the sample 71 is ablated by at least one second laser pulse emitted by the pulsed laser source 72. When the distance between the waist position and the surface of the sample 71 is less than the third distance threshold, a plasma is created by at least one third laser pulse emitted by the pulsed laser source 72.

In one embodiment, the optical power/amplitude of the emitted laser pulse may further be adjusted in addition to the adjustment of the waist position in order to adjust the irradiance of the laser pulses to adequate values to dry, clean or analyze the sample 71. In this case, the controller 76 is adapted to control the pulsed laser source 72 in order to adjust the optical power of the emitted laser pulses to obtain the desired irradiance. In one embodiment, the pulsed laser source 72 comprises a filter adapted to change the optical power of the laser pulses emitted by a laser and the controller 76 is adapted to control the filter.

In another embodiment, the focusing device 74 is adapted to focus the pulsed laser beam at a given position along the optical path thereof in order to position the waist of the pulsed laser beam at the given position, but it is not capable of varying the position of the waist of the pulsed laser beam. In this case, the desired values for the irradiance of the laser pulses are obtained by adjusting the optical power/amplitude of the laser pulses. In this case, the controller 76 only controls the pulsed laser source to provide the laser pulses with the desired irradiance. In one embodiment, the pulsed laser source 72 comprises a filter adapted to change the optical power of the laser pulses emitted by a laser and the controller 76 is adapted to control the filter and adjust the irradiance of the laser pulses.

In a further embodiment, the desired irradiance may be achieved by changing the time duration of the laser pulses emitted by the pulsed laser source. In this case, the controller 76 is adapted to control the pulsed laser source 72 to adjust the duration of the laser pulses emitted by the pulsed laser source 72 in order to obtain the above-described desired irradiances.

It should be understood that any adequate method and system for adjusting the irradiance of laser pulses at the surface of a sample may be used. For example, a desired irradiance of a laser pulse at the surface of the sample may be achieved by controlling the amplitude of the laser pulse, controlling the time duration of the laser pulse, and/or controlling the waist position of the pulsed laser beam that contains the laser pulse.

It should also be understood that the pulsed laser source may comprise more than one laser. The lasers may emit laser pulses having different characteristics such as different wavelengths, different amplitudes, different time durations, and/or the like.

Referring back to FIG. 4, the photodetector 78 is adapted to detect light emitted by the plasma that is created by the interaction of the sample 71 and a laser pulse having an irradiance greater than the breakdown threshold at the surface of the sample 71. The photodetector 78 further converts the detected optical signal into an electrical signal which is indicative of the detected light. The electrical signal is transmitted to the composition determining unit 80 which determines the chemical composition of the sample 71.

It should be understood that any adequate focusing device adapted to focus a pulsed light beam at a focus position and optionally vary the focus position along the optical path of the pulsed light beam may be used. For example, the focusing device may comprise a focusing telescope such as a Galilean telescope, a Cassegrain telescope, or a Newtonian telescope. In another example, the focusing device may comprise a polymeric lens of which the focal plane position depends on a voltage applied thereto.

It should be understood that the systems 10 and 50 may be combined together to obtain a system adapted to dry, clean and analyze objects that may be present along a predefined scan path. The resulting system may be used for scanning samples moving on a conveyor belt.

In the following, there is described an example of a LIBS system adapted to clean and dry the surface of a sample to be analyzed and analyze the composition of the sample.

In this example, drying the surface using irradiance lower than the ablation threshold for getting rid of water droplets and/or adsorbed water on the target surface. Scanning a depth of field (Z-axis, normal standoff distance between the instrument and the sample greater than height of the material on the conveyor belt) using a lens mounted on a fast focus shifter device reaching allows reaching the irradiance ablation threshold (for cleaning of the surface on a larger spot size) and the irradiance breakdown threshold to produce a laser-induced plasma for spectrometric analysis by LIBS.

In this example, the laser-induced plasma light emission is collected collinearly using an optical filter and routing it to a spectrometer for spectrochemical analysis by atomic emission spectrometry. There is further a step of scanning the orthogonal dimension to the material flow (X-axis) and the depth of field (Z-axis) to repeat the above-described processes for another target at high frequency.

Figure 5:
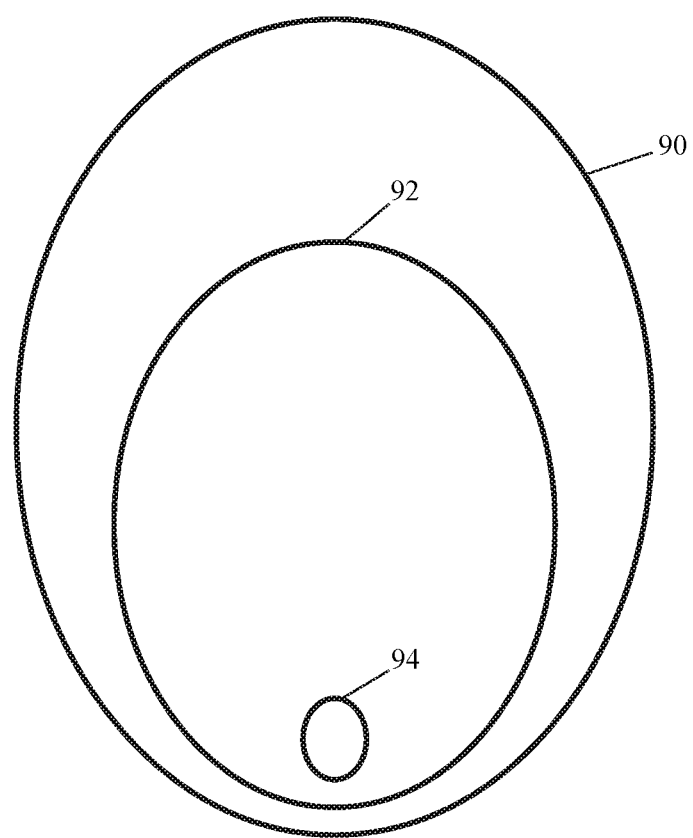
FIG. 5 illustrates the footprint of laser pulses having different irradiances on the surface of a sample, in accordance with an embodiment.

In this example, three different regimes of laser-matter interaction are reached using a same laser for preparation of the surface of a material and analysis of the material. The first regime for drying the target surface removing water droplets and/or adsorb water using a fixed laser power but focus on a diameter ($1/e^2$) larger than that of the second regime. The second regime for cleaning or ablating produces a reproducible and controlled ablation that removes the undesired coating layer or dirt with the same power but focus on a smaller diameter ($1/e^2$) than drying regime but larger than analysis regime leading to cleaning of the surface, followed by a third regime where irradiance exceed the breakdown threshold to create a laser-induced plasma for atomic emission spectroscopy. The third regime for analysis scans inside the cleaned area with overlapped spots in order to avoid the edges of the cleaned area, as illustrated in FIG. 5 in which the element 90 illustrates the footprint of a drying regime pulse of the sample, the element 92 illustrates the footprint of a cleaning regime pulse on the surface of the sample, and the element 94 illustrates the footprint of a plasma generating laser pulse on the surface of the sample. The third regime probe, collinear with the first, has a smaller sampling area reaching the required irradiance to allow generation of low background analytical plasma. The plasma emission is then collected and separated in an optical spectrometer.

The present example further provides a method of analyzing materials using LIBS, comprising directing a depth of field scan at a specific angle between Y-axis and Z-axis using a beam deflector device (e.g. galvanometer equipped with a broadband mirror) to dry, clean, create a plasma, and analyze the emitted light using LIBS to determine the chemical composition of the material. Therefore, it allows scanning the depth of field at a specific angle each time the irradiance will exceed the breakdown threshold of the material for a short amount of time when a target is present in the depth of field on the conveyor leading to a single analysis.

Figure 6A:
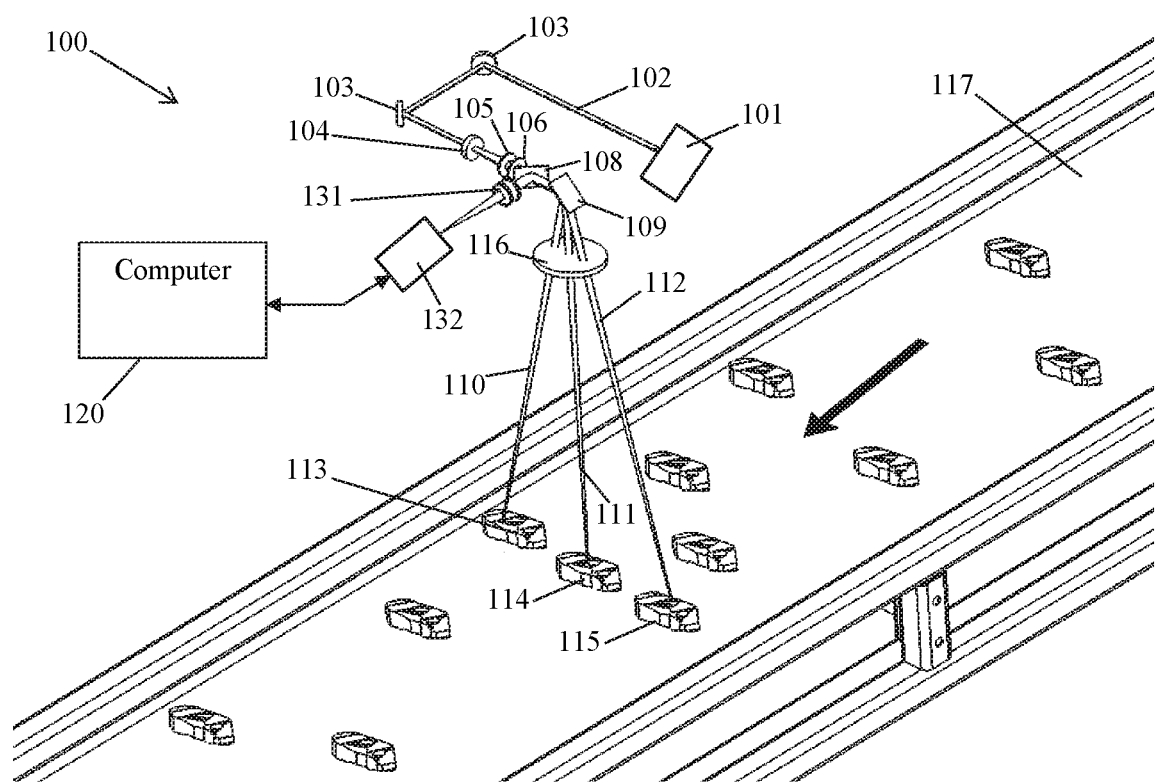
FIG. 6a is a perspective view of an exemplary LIBS system for scanning three scan directions.
Figure 6B:
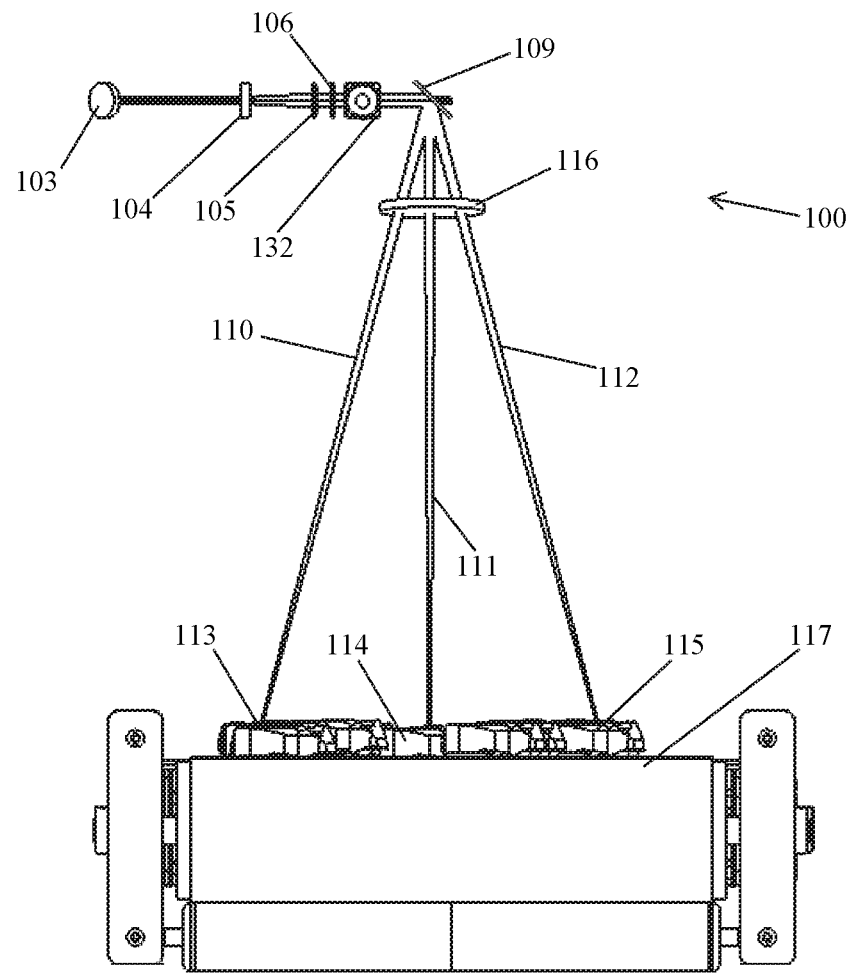
Figure 9:
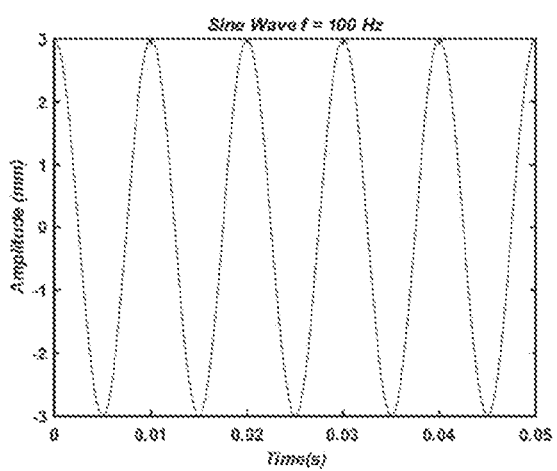
FIG. 9 illustrates the displacement of a focus shifting device, in accordance with an embodiment.

The following example is given for illustrative purposes and cannot be interpreted as any limitation of the generation of the invention. FIGS. 6a and 6b show a schematic overview of a LIBS apparatus 100 according to one embodiment. The apparatus 100 generally includes a pulsed fiber laser 101, a galvanometer 109, a high pass filter 108, a spectrometer 132, and a system computer 120. The apparatus 100 is configured to generate laser pulses from the fiber pulsed laser 101. The pulsed laser beam 102 is directed using mirror 103 to a telescope comprising a diverging lens 104, and a converging lens 105 to allow controlling the focus on target. A second converging lens 106 is place to minimize the spot size and therefore increase the irradiance on target. The pulsed laser beam passes through a high band filter 108 before it is deflected using a broadband mirror mounted on a galvanometer 109 in order to be routed to the sample 113, 114 or 115 through a light transparent protective windows 116 at different deflection angles 110, 111, and 112 to focus onto samples 113, 114, and 115 with a moving lens 104 and thereby produce a plasma plume on samples 113, 114, and 115. The galvanometer 109 is electrically coupled with the system computer 120 for sending desired deflection angles 110, 111, and 112 to scan the conveyor belt 117 for sample targets preparation and analysis process as described further below. The galvanometer 109 can be programmed to scan a given region according to desired discrete scan angles on the conveyor belt 117 at a given frequency. Any intermediate scan angle can be programmed through the system computer 120 to deflect the laser beam using the galvanometer 109. When the a specific scan angle is reached 112, the diverging lens 104 of the telescope is moved accordingly to a sine wave pattern, as illustrated in FIG. 9, and the acquisition of the light emitted by the corresponding plasma on sample 115 is synchronized. It should be understood that any adequate pattern may be used for moving the diverging lens 104 of the telescope. For example, a triangular wave pattern may be used. The light emitted by the plasma is routed collinearly on the galvanometer mirror 109 and reflected onto the high pass filter 108 to the collecting optics 131, and finally enters the spectrometer 132 for atomic emission spectrometric analysis. The spectrometer 132 integration time is synchronized to the sine wave scanning pattern of the diverging lens 104 scan for any angle scanned by the galvanometer 109. The apparatus 100 can include a system frame for housing the various components described herein. The system frame can include a temperature control component to minimized instrument drift that may affect the accuracy of the measurement in time.

Figures 7A, 7B:
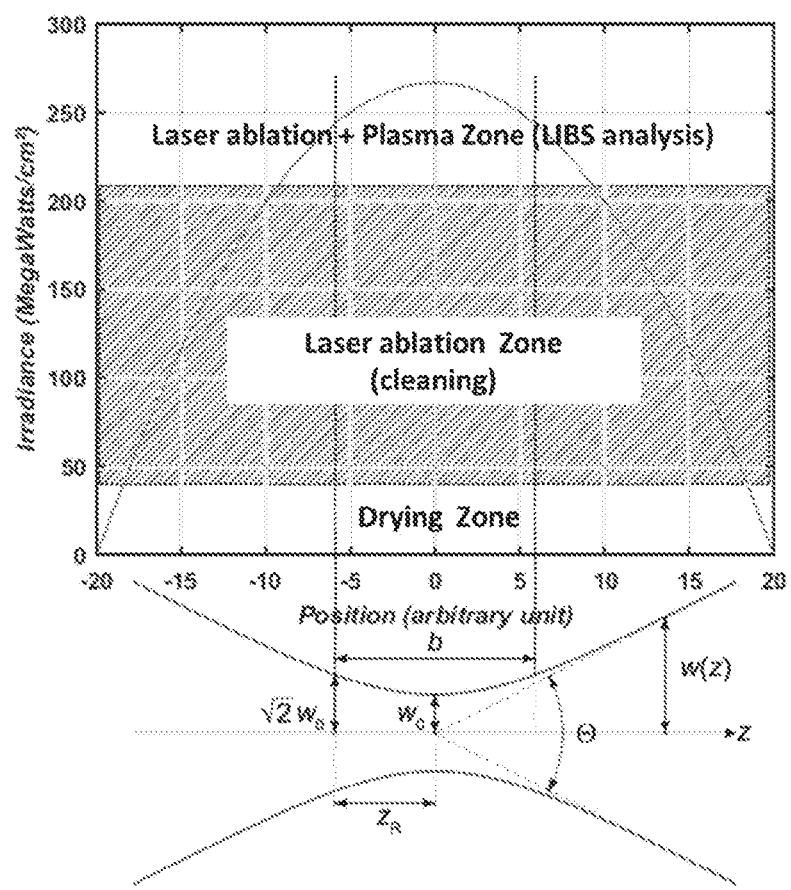
FIG. 7a is a graph illustrating the irradiance as a function as waist position, in accordance with an embodiment.
FIG. 7b is a graph illustrating the waist diameter of a laser beam as a function of a position along the laser beam, in accordance with an embodiment.

The pulsed laser 101 in an exemplary embodiment comprises a fiber pulsed laser for generating energy in the near infrared region of the electromagnetic spectrum with a wavelength of about 1064 nm, but any electromagnetic emitting device with sufficient energy can be used as an energy source, but continuous emitting sources are not excluded. The pulse duration for the analysis is a few tens of ns for generating a laser beam with a power density at a focal point that is sufficient for producing laser-induced plasma for analysis by atomic emission spectrometry. The laser 101 can have a repetition rate of approximately 10 MHz or alternately lower than 100 Hz in some embodiments. Alternatively, the pulse duration can vary from few tens of femtoseconds for example to hundreds of nanoseconds for example or be continuous. The telescope is composed of a diverging lens 104, and a converging lens 105. This transmission telescope is exemplary only and the telescope can also be in an equivalent reflection configuration to allow the same purpose (i.e. standoff focus of the laser beam). The diverging lens 104 is mounted on a moving apparatus that allows increasing the depth of field at least by a factor of about 100. The diverging lens 104 is moving back and forward for a few millimeters, thereby allowing an increase of the depth of field over the conveyor belt by displacing the small depth of field of the lens on a large distance using the combination of the telescope and the focus shifter. The following example is given for illustrative purposes. FIG. 7a illustrates the variation of irradiance produced by the telescope arrangement of 104, 105, and 106, when the diverging lens 104 is fixed while FIG. 7b illustrates the diameter of the laser beam. The maximum irradiance is reach at position 0 which is the middle of the Rayleigh zone b illustrated in FIG. 6b. The Rayleigh zone b is the preferred zone for LIBS analysis since material can be ablated and plasma can be produced and the irradiance exceeds the breakdown threshold. A target surface positioned in the Rayleigh zone b will generate a plasma which will be detected by the spectrometer 132, while outside the Rayleigh zone b the irradiance on target will be cleaning the surface by laser ablation (when irradiance is greater than the ablation threshold but lower than the breakdown threshold) or drying the surface by a photo-thermic effect when irradiance is lower than the ablation threshold.

Depending on the speed of the conveyor belt 117, the person skilled in the art will choose a suitable stepping angle to scan the belt. In one embodiment, the galvanometer scan head 109 can have a translation rate of approximately 200 mm/s for a given sampling frequency and 7000 mm/s for a significantly faster scanning regime.

The spectrometer 132 collects electromagnetic information from the plasma plume at angle 110, 111, and 112. The spectrometer 132 can be monochromator or polychromator. The electromagnetic information includes spectral information identifying an elemental composition of the samples 113, 114, and 115. A spectral range for the spectrometer 132 can be chosen to suit different applications. In an exemplary embodiment the spectral range can be approximately 50 nm for observing a portion of the electromagnetic wavelength range. Alternatively, the spectrometer 132 can detect electromagnetic radiation in a range of 170 to 980 nm. The light emitted by the plasma plume is directed to the high pass filter 108 through the galvanometer scan head 109 following sufficiently collinear with the light pass for plasma generation. The high pass filter 109 reflects the light to the collecting optics 130 and 131 which focus the light to the entrance of fiber cable or guiding the light directly to the spectrometer 132. The spectrometer 132 reflects the light to a grating that disperses the plasma light. At the exit of the spectrometer 132, the detector is coupled with the spectrometer 132 for detecting the dispersed plasma light. The detector provides the detected plasma light to the system computer 120. The system computer 120 generates spectral information from the emitted plasma light of the laser plume 115. The spectral information includes intensity data representing elemental information and composition of the sample site 115. The system computer 120 can use any adequate mathematical approach to process the signal in order to extract the information needed in the emission spectrum. Algorithms and approach normally known by the person skilled in the art of chemometrics, multivariate statistics, machine learning, among others can be used to interpret the spectrometric data. The spectral information or the interpreted results can be produced on a human machine interface or directly routed to the production line network.

The detector 132 provides increased resolution and greater selectivity of the spectral information. The detector in the spectrometer 132 includes a micro channel image intensifier plate. The intensifier plate is preferably gated during the period of time when the plasma plume 113, 114, and 115 emits characteristic atomic emission lines of the samples. This period coincides with an optimum plume luminance period. This period follows emission of continuum radiation. Continuum radiation lacks useful specific species or elemental information.

In one embodiment, a delay generator (not shown) can be included to provide gating of the detector 132 to allow temporal resolution of the detector response time. Alternative embodiments of the detector in the spectrometer 132 can include a detector other than an ICCD, for example a suitable charge coupled device (CCD) or suitable photomultiplier. Accuracy of the spectrometer 132 and detector in one embodiment can generate compositional data in the range of 10,000 ppm or less. Alternatively, the accuracy can be in the range of a few %. In another embodiment, the accuracy can be in the range of 1%. Also in another embodiment the polychromater can be an Echelle spectrometer or a Pachen Runge spectrometer that can be coupled to several linear CCD covering the whole spectrum 170-900 or some portion of the spectrum of interest depending the application.

The system computer 120 can include application software and a controller in the system computer 120 for providing synchronization of the laser 101, spectrometer 132, diverging lens 104, and galvanometer scan head 109. The galvanometer scan head 109 can also be any adequate kind of optic device to deflect the laser beam onto the sample. The system computer 120 is electrically coupled with the laser 101, spectrometer 132, diverging lens 104, and galvanometer scan head 109. The system computer 120 may include a human machine interface or be directly routed to the production line network for displaying or communicating spectral information. The system computer 120 can present the spectral data generated on human machine interface or directly routed to the production line network. Alternatively, a separate personal computer can also be coupled with the system computer 120 for separately analyzing the spectral information or remote access. The system computer 120 can include a power controller to regulate power to all the apparatus 100 components and also sensor for safety. Additionally, the system computer can be replaced by an embedded electronic system that will act exactly as the system computer 120.

The application software decodes the spectral information from the spectrometer 132, facilitates analysis of the spectral information and generates composition information of the sample 113, 114, and 115. The application software allows setting of certain parameters for performing the laser ablation of the samples 113, 114, and 115.

Figure 8:
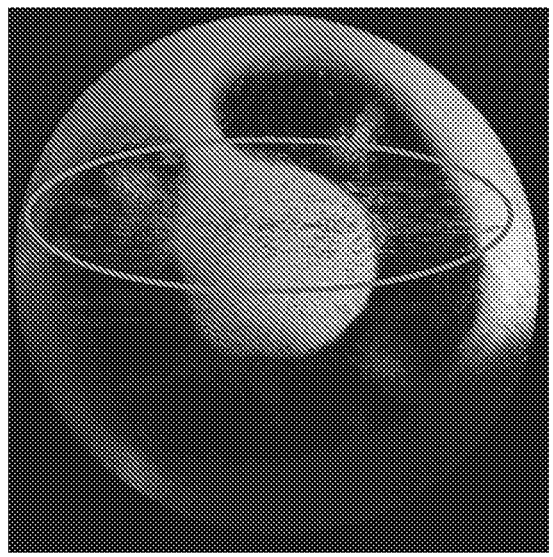
FIG. 8 is a picture of the surface of a sample, in accordance with an embodiment.

As mentioned above, the cleaning regime will remove oxide, paint and/or dirt at the sample surface, as shown in FIG. 8, that the cleaning regime is able to remove black dust on the sample surface.

It should be understood that the present methods and systems are not limited to the analysis of solid materials and may be used, for example, for the analysis liquids (aqueous and other solutions) where more than a single phase is present, such as high temperature molten materials (e.g. metals, metallurgical mattes, salts and glasses). The above-described methods and systems may also be applicable to the preparation of the surface of materials in liquid phase. The above-described methods and systems may also be used for the analysis of both homogeneous and heterogeneous materials. In addition, they can be used to sample air constituent and/or liquid and solid particles in suspension in air.

In the agriculture sector, the present methods and systems can be used in various ways to determine the elemental analysis of a soil sample or to determine its pH in order to prepare a fertilization plan. One possibility is to analyze non-prepared soil sample by mounting the present system on a rover or a trailer. In one embodiment, the present methods and systems may allow obtaining an accurate sampling, reproducible measurements and results much faster than other analytical methods known in the art. The off-line determination by ICP, for e.g. requires sample preparation and analysis that takes one hour or more. Similarly to the analysis of soil, the present methods and systems can be applied to the analysis of metallurgic powder.

In one embodiment, the present LIBS methods and systems provide rapid, in situ, compositional analysis without touching the surface and may be employed in a wide range of applications such as, the monitoring of active agents in pharmaceutical pills, the analysis of soil to determine its impurities and fertilizer content, the quality assessment of metallic alloys, the determination of the composition of molten metallic alloys, or the like. One major challenge for these industries is increasing productivity, reducing costs, and maximizing benefits from existing equipment.

In one embodiment, the energy sources can be one, two or three lasers disposed such that their optical paths are substantially collinear. A small deviation from collinearity is acceptable. In one embodiment, the measuring device, e.g. a spectrometer, is preferably disposed substantially collinearly with the optical path of the laser beams.

The embodiments of the invention described above are intended to be exemplary only. The scope of the invention is therefore intended to be limited solely by the scope of the appended claims.

We claim:

1. A system for optically scanning a region comprising a sample of which a chemical composition is to be determined, comprising:

a pulsed laser source for emitting a pulsed laser beam comprising a plurality of temporally ordered laser pulses;

a focusing device for adjusting a position of the waist of the pulsed laser beam to a given position corresponding to a focal plane along the optical path of the pulsed laser beam and for varying the position of the waist of the pulsed laser beam within a given range of positions corresponding to a given range of focal planes;

a beam deflector for adjusting a propagation direction of the pulsed laser beam to a desired scan direction;

a controller being in communication with the focusing device and the beam deflector, the controller for varying, via the beam deflector, the propagation direction of the pulsed laser beam according to a predefined beam path in the region comprising the sample and varying, via the focusing device, the given position of the waist of the pulsed laser beam along the optical path of the pulsed laser beam within the given range of positions; and a photodetector for detecting light emitted by a plasma created when a given one of the laser pulses has an irradiance at a surface of the sample located on the optical path is greater than a breakdown threshold, the detected light being indicative of the chemical composition of the sample;

wherein a speed of variation of position of the waist of the pulsed laser beam by the focusing device is above the speed of variation of the propagation direction of the beam deflector.

2. The system of claim 1, wherein the beam deflector comprises a rotatable mirror for reflecting the pulsed laser beam according to a desired scan angle.

3. The system of claim 1, wherein the focusing device comprises a focusing telescope.

4. The system of claim 3, wherein the focusing telescope comprises a Galilean telescope having a movable diverging lens and a converging lens.

5. The system of claim 4, wherein the focusing telescope comprises a motorized focus shifter for moving the diverging lens.

6. The system of claim 1, wherein the pulsed laser source operates at frequencies above 100 Hz.

* * * * *